US009002003B2

(12) United States Patent
Brown et al.

(10) Patent No.: US 9,002,003 B2
(45) Date of Patent: Apr. 7, 2015

(54) PASSWORD PROTOCOL FOR DATA COMMUNICATION SYSTEM

(75) Inventors: Daniel R. L. Brown, Mississauga (CA); Marinus Struik, Toronto (CA)

(73) Assignee: Certicom Corp., Mississauga, Ontario (CA)

( * ) Notice: Subject to any disclaimer, the term of this patent is extended or adjusted under 35 U.S.C. 154(b) by 1922 days.

(21) Appl. No.: 11/947,290

(22) Filed: Nov. 29, 2007

(65) Prior Publication Data

US 2008/0144817 A1 Jun. 19, 2008

Related U.S. Application Data

(60) Provisional application No. 60/867,752, filed on Nov. 29, 2006.

(51) Int. Cl.
*H04L 9/00* (2006.01)
*H04L 9/30* (2006.01)
*H04L 9/08* (2006.01)
*H04L 9/32* (2006.01)

(52) U.S. Cl.
CPC ............ *H04L 9/3066* (2013.01); *H04L 9/0863* (2013.01); *H04L 9/0861* (2013.01); *H04L 9/3226* (2013.01)

(58) Field of Classification Search
None
See application file for complete search history.

(56) References Cited

U.S. PATENT DOCUMENTS

| | | | | |
|---|---|---|---|---|
| 5,588,056 A * | 12/1996 | Ganesan | | 713/183 |
| 6,446,205 B1 * | 9/2002 | Lenstra | | 713/168 |
| 7,139,917 B2 * | 11/2006 | Jablon | | 713/183 |
| 2007/0300076 A1 * | 12/2007 | Diffie et al. | | 713/184 |
| 2008/0049939 A1 * | 2/2008 | Canetti et al. | | 380/277 |

OTHER PUBLICATIONS

Brown, D. R. L.; "Prompted User Retrieval of Secret Entropy: The Passmaze Protocol"; Dec. 15, 2005; ePrint 2005/434; IACR; http://eprint.iacr.org/2005/434.
Brown, D. R. L. et al.; "The Static Diffie-Hellman Problem"; Jun. 23, 2005; ePrint 2004/306; IACR; http://eprint.iacr.org/2004/306.
Ford, W. et al.; "Server-assisted generation of a strong secret from a password"; Proceedings of the IEEE 9th International Workshops on Enabling Technologies: Infrastructure for Collaborative Enterprises; Jun. 2000; pp. 176 to 180; IEEE Computer Society; Washington, DC, U.S.A.
Brown, D. R. L.; "Prompted User Retrieval of Secret Entropy: The Passmaze Protocol"; Nov. 28, 2005; ePrint 2005/434; IACR; http://eprint.iacr.org/2005/434.
Brown, D. R. L.; "Prompted User Retrieval of Secret Entropy: The Passmaze Protocol"; Nov. 29, 2005; ePrint 2005/434; IACR; http://eprint.iacr.org/2005/434.

* cited by examiner

*Primary Examiner* — Nadia Khoshnoodi
(74) *Attorney, Agent, or Firm* — Fleit Gibbons Gutman Bongini & Bianco P.L.

(57) ABSTRACT

A password protocol uses a multiple word password and provides prompts to a user allowing the user to select the next word in the password from a set of words. The selection of a word causes a client to perform a cryptographic operation and generate a new selection of words. After the password is completely entered, a key is generated from the words selected.

20 Claims, 2 Drawing Sheets

PASSWORD PROTOCOL FOR DATA COMMUNICATION SYSTEM

This application claims priority from U.S. Application No. 60/867,752 filed on Nov. 29, 2006, the contents of which are incorporated herein by reference.

FIELD OF THE INVENTION

The present invention relates to a method and system for implementing password protocol in a data communication system.

BACKGROUND OF THE INVENTION

The security of a data communication system is of prime concern to any user of such a system. Each link in a system must be secure and the interface between successive links must also be secure. At the same time, access to the system by a legitimate user must by facilitated so as not to impede the flow of information or the usefulness of the system.

The flow of information within a system is usually secured by one or more cryptographic functions deployed at different stages. These functions will make use of cryptographic keys and rely on those keys to secure the system. A proper analysis of the security of a system therefore includes the potential access to the keys that are used.

Users are generally treated as the weakest link in the information security chain. A users' main contribution to security is the relatively low-entropy passwords that are used to gain access to the system. A users' long-term keys, if any, are generally stored in a device and encrypted with the password. The entropy of a user's password is a measure of the randomness in a password and is usually expressed in bits. A 20 bit random number has $2^{20}$ values and is said to have 20 bits of entropy. Therefore, a password with 20 bits of entropy is as hard to guess as a 20 bit random number. The entropy of a password also represents the relative cost of an adversary to extract the key from its password-encrypted form, which would be approximately $2^{20}$ password-decryptions in this example. Access to the stored password-encrypted user key by a given password should therefore be limited to below this value.

Passwords may provide adequate security in many applications. However, the low-entropy nature of passwords is not intrinsic to human nature, but rather to the computer user interface. Human memory, including memory of personal secrets, has a capacity far greater than what is needed for a secure cryptographic key. Unfortunately, keyboard entry of passwords (or passphrases) has relative low entropy input rate per character stroke, and as the number of character strokes increases, so does user inconvenience and chance of user error.

There is therefore the need for an interface that permits high entropy passwords to be utilized in a convenient manner. Accordingly, the longer the password required, the more likely it is that a well known phrase will be used, and therefore easier for an adversary to guess.

SUMMARY OF THE INVENTION

In general terms, the present invention provides a prompting protocol for users to input high-entropy secrets.

In the protocol, the user interacts with a client, which is a computer that performs cryptographic operations on behalf of the user. The protocol causes the client to present a prompt to the user. Ideally, the prompt is a list of choices for the user to select. After each user selection, the client performs a cryptographic operation, optionally with the help of a server, to compute another prompt for the user. At the end of the protocol, the user selections combine to give a user key.

When such a protocol is combined with the known deliberately slow cryptographic operations, the user's contribution to security may also be regarded a factor in computing power that an adversary must overcome. The resulting factor is much higher than the corresponding factor for passwords.

The key that is retrieved is most ideally suited to decrypt other keys of a user stored on the user client or elsewhere. It can also be used directly in a cryptographic operation or keys can be derived from the retrieved key.

An important application is to use the retrieved key to protect a users key, to derive a users key, or to use it as a private key in an asymmetric cryptosystem, such as digital signature algorithm or public key encryption scheme. Unlike many other key retrieval schemes, the user provides all of the entropy to the retrieved key. This is most beneficial for digital signatures in the sense that it also provides for non-repudiation. The retrieved key is not limited to asymmetric cryptosystems, of course. It may be used in symmetric cryptosystem as well, such as pre-shared secret authentication encryption schemes, or password based key agreement schemes. It may be used in any place that a conventional password can be used.

In one aspect, there is provided a method to control access to a data communication system with a password comprising providing a first plurality of possible choices to a user; receiving a first selection from the first plurality of choices; performing a cryptographic operation upon the first selection to generate a first output; utilizing the first output to provide a second plurality of choices to the user; receiving a second selection from the second plurality of choices; and computing a user key from the first and second selections.

In another aspect, there is provided a system for controlling access to a data communication system with a password comprising a client configured to receive input and provide output to a user and capable of communicating with at least one other entity in the data communication system, the client comprising a cryptographic engine being configured for providing a first plurality of possible choices to the user; receiving a first selection from the first plurality of choices; performing a cryptographic operation upon the first selection to generate a first output; utilizing the first output to provide a second plurality of choices to the user; receiving a second selection from the second plurality of choices; and computing a user key from the first and second selections.

BRIEF DESCRIPTION OF THE DRAWINGS

An embodiment of the invention will now be described by way of example only with reference to the accompanying drawings in which.

DETAILED DESCRIPTION OF THE INVENTION

Figure 1:
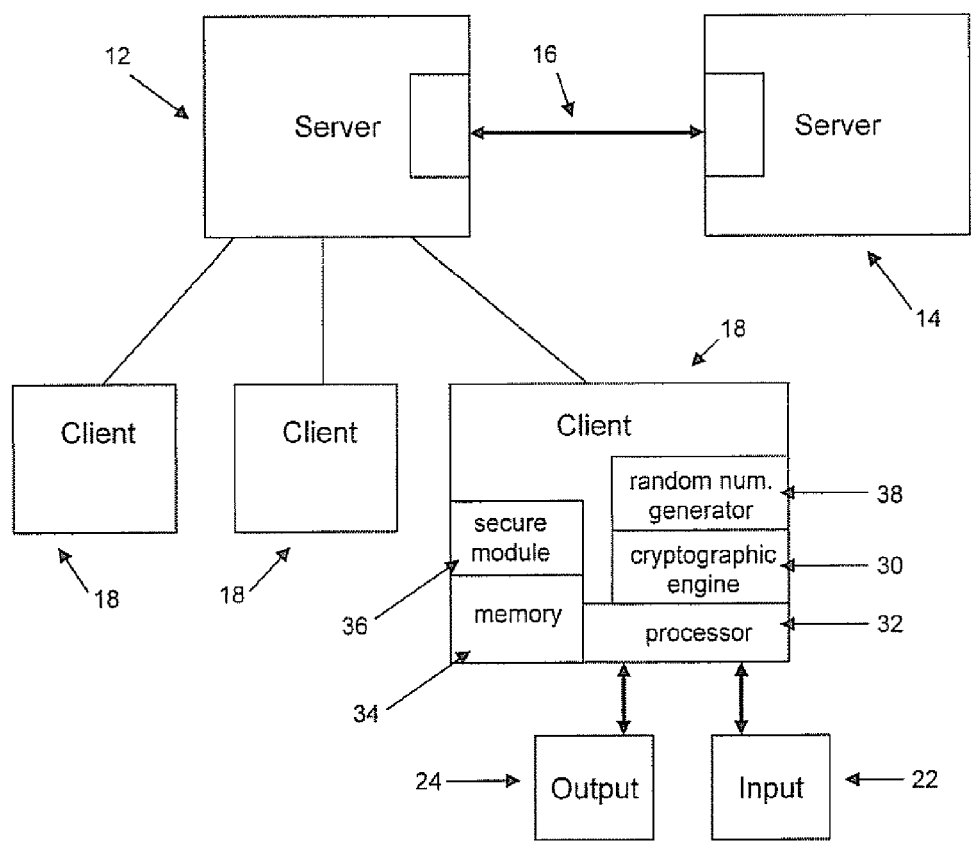
FIG. 1 is a schematic representation of a data communication system.

Referring therefore to FIG. 1, a data communication system generally indicated at 10 includes a pair of servers 12, 14 interconnected by a communication link 16. At least one of the servers 12 in the embodiment of FIG. 1 has one or more clients 18 communicating with the server 12 over communication links 20. Each of the clients 18 incorporates an input device 22 and an output device 24. The input device 22 may for example be a keyboard or mouse device and the output device 24 may be a screen or an audible output. Conveniently, the input and output devices may be combined in a touch sensitive visual display although it will be appreciated that other forms of input and output devices may be used.

The client includes a cryptographic engine 30 to perform cryptographic functions under the direction of a processor 32. The client also includes a memory 34 for storing program listings and transient information. Memory 34 also stores a dictionary of words that are easily recognisable by a user and that have the requisite entropy. such a list may be obtained from a spell checking dictionary for example. Each of the words is stored at a unique address in the memory 34 for subsequent retrieval. The memory 34 will include a secure module 36 for storing secret information such as keys.

It will be appreciated that the server 14 may be similarly connected to client devices 18 or may be part of a larger network through suitable links.

In order for the client to communicate securely with the server, a secret key S is stored in the secure module 36 within the memory 34. The key S may be used in cryptographic operations, such as to encrypt messages between the server or to sign messages for verification by the server.

Access to the secret key S is limited to authorized users by means of a password that is supplied through the input 22. Typically, the password would be used to encrypt the key S so that input of the password 22 may then be used to decrypt the key S and permit its use to secure transmissions to the server 12.

Figure 2:
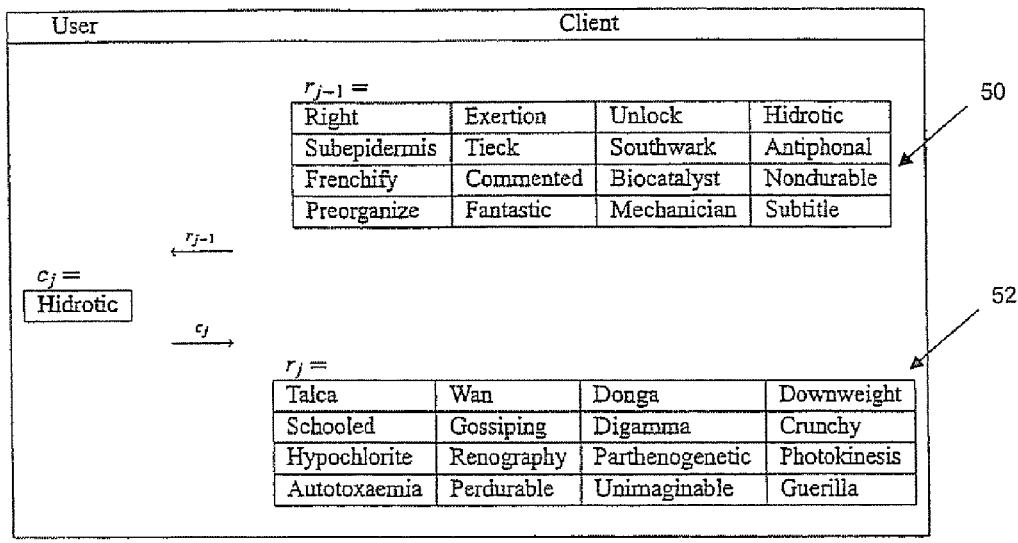
FIG. 2 is a representation of an interface utilized in the system of FIG. 1.

To enhance the security provided by the password P, the input 22 and output 24 are used to provide sequential prompts to the user to select the next word of the password, as illustrated in FIG. 2.

Referring therefore to FIG. 2, a selection of words from a dictionary stored in the memory 34, as indicated at 50, is displayed on the output device 24. The user has previously remembered a multiple word password established by the client, as will be explained more fully below. One of the words displayed corresponds to the first word in the password and is selected using the input device 22. This then causes a further list of words as indicated at 52 to be displayed. The second word of the password is displayed in that list and is selected. The process continues until no more responses to the choice made is available.

Figure 3:
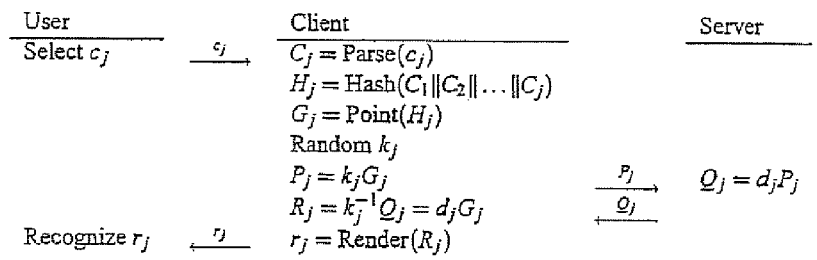
FIG. 3 illustrates a round of the protocol employed in the system of FIG. 1.

The words selected from the sequential lists are combined to form a password that is used to generate a key K, to access the secret key S. The generation of the key K is illustrated in FIG. 3, commencing with the selection of the required word from one of the lists. The selection $c_j$ is parsed by the client to provide a parsed component $C_j$. Each of the parsed components, (or the aggregation of parsed components) is saved in the memory and recalled at each step to form a concatenation of parsed components $C_1 \| C_2 \| \ldots$ to $C_j$. The concatenation is hashed using a cryptographic hash function, such as SHA-2 to obtain a hash $H_j$.

The crypto function 30 conveniently implements an elliptic curve cryptosystem, although other cryptosystems may be used such as RSA or DSA. The hash $H_j$ is converted into an element of the finite field used in the cryptosystem, in this case a coordinate of a point $G_j$ on the underlying curve. The output of the hash $H_j$ is a bit string that may be used as the x-coordinate of a point lying on the curve. The value of the bit string is checked to ensure it does represent a valid point, and, if not, incremented until a valid point is found. The corresponding y coordinate may then be derived and the resultant point used in further elliptic curve operations.

Alternatively, the x coordinate may be used without recovery of the y coordinate using appropriate elliptic curve arithmetic and in either case the first bit of the bit string may be used as an indication of which of the values of the y coordinate is the appropriate one. Such techniques for point computations and recovery are believed to be well known and need not be discussed further.

A random integer, $k_j$, is generated from a random number generator 38 within the crypto function. The random number $k_j$ is combined with the point $G_j$ to form a point $P_j = k_j G_j$. The point $P_j$ is forwarded to the server 12 in the clear where it is combined with the servers private key $d_j$ to form a new point $Q_j$. The random value $k_j$ serves mainly to blind communication between the client 18 and server 12 so that the server does not learn the users selection and neither does an adversary intervening between the client 18 and server 12. The secret key $d_j$ mainly helps to protect the user from adversaries using an unauthorized client to capture the users selections.

The point $Q_j$ is returned to the client where a value $R_j$ is computed using the inverse of $k_j$ combined with $Q_j$. This is equivalent to the value of $d_j G_j$. The bit string representing the point $R_j$ is rendered to obtain a set of values that identify words stored in the dictionary in the memory. In its simplest form, the bit string is subdivided into a set of equal length words, e.g. a 256 bit string is divided into 16 bit strings of 16 bits each that are used as respective addresses in the dictionary. The resultant values derived from $r_j$ are used to retrieve particular words in the dictionary which are displayed for selection by the user. The user selects the next word in the phrase and upon selection, the value $c_{j+1}$ is returned and the sequence repeated.

After the final user choice, $c_k$ for which there is no choice client response $r_k$, the client derives the key K from all the users selections as $K = H(C_1 \| C_2 \| \ldots C_k)$. The retrieved key K is then used to access the secret key S such as by decrypting it, and allowing the key S to be used in to secure communications between the server and client.

Neither the client 18 nor the server 12 stores any permanent records or individual user choices $c_j$ and client responses $r_j$ and ideally the client keeps the retrieved key K only as long as the user needs it. This helps to protect the retrieved key K if the client device 18 is lost.

During the process, the client does not know whether any of the users selections $c_j$ is correct or not so it does not provide any explicit feed back on the correctness of each selection $c_j$ to the user. The client responds to every choice as if correct and so computes the next prompt $r_j$ as a function of $c_j$ for whatever value of $c_j$ the user entered.

The authorized user may be able to detect if the choice $c_j$ was correct by observing the response $r_{j+1}$. The prompt $r_j$, if correct, should contain her next choice $C_{j+1}$. If she does not see her next choice $c_{j+1}$ then she will conclude that she accidentally mis-entered the wrong choice $c_j$ or that a client and server are failing to operate correctly.

The above sequence assumes that the authorized user knows the correct sequence of prompts that will be established during initialization. Initialisation of the password is performed using the sequence set out in FIG. 3 at each step. An initial set of words is presented to the user who selects a first of those as the first word in the password. The initial set of words can be generated by producing a random value from the random number generator 38 for use as the initial value $C_0$ or may be an input from the user such as a name and a password which is parsed to provide $C_0$. The client 18 returns a response $r_1$ to display a further set of words. The user selects one of those words as $c_1$ and continues the process until the requisite number of words is selected.

During the initialization, the successive words are stored in memory 34 and then replayed to the user until the password is memorized. The words may be displayed as a list or, more usefully, the user is led through the sequence one display at a time with the correct selection indicated on the display. Once the sequence is memorized, the learning mode is disabled and the stored selections erased.

A less ideal initialization procedure is the user to decide the values of $c_j$. Users may prefer this, as they can choose values of $c_j$ more personally meaningful and memorable to them. Unfortunately, it is difficult to assess how much entropy users will put into their choices $c_j$, so it is potentially possible for users to select insufficient entropy. Even in this mode, users may require some practice runs in order to be sure to correctly reproduce the choices $c_j$ when needed later. As a compromise, it is possible for some choices $c_j$ to be user decide, and some to be client decided.

During normal use of the password, the display 24 provides no indication of whether the selection of $c_j$ is correct or not. Even if an incorrect value is selected the client forces the user to complete the selection and make choices for all values $c_1$ . . . $c_n$ before any indication of correctness is given.

Because the client binds its communication with the server, the user can remain anonymous during the key retrieval process. Anonymity has certain advantages and disadvantages. If anonymity is not desired, then the client can reveal the identity of the user to the server. Furthermore, the server may be able to customize its responses to individual users, which may enhance the security somewhat. Where the cryptosystem is based on the RSA and its variants, alternative binding mechanism and server function pair are available.

The server acts as a raw ECDH oracle, which has some potential security risks. This risk can be avoided by using appropriately chosen groups, particularly groups of order n where (n−1) and/or (n+1) have no small divisors or by the client being implemented as a trusted module that the server can authenticate.

Although the retrieved key can be use for any purpose, probably the most versatile use of the retrieved key is to protect other user keys. The retrieved key can then protect an arbitrary amount of user keying material.

The server and the client can be embedded on the same device. In this approach, the server could be specific to the user, so that the server private key is unique to the user. Then, other devices cannot impersonate the users device in order to steal the user's secret. This mechanism has considerable security benefit.

The client can include decoys in the prompt. The decoys are random options that are not deterministic functions of the user's previous selections. The decoys serve mainly to prevent over-the-shoulder attacks in which an adversary sees just one option per round. Even if these options are not the user selections, the adversary can test all the choices $c_j$ to see if $r_j$ has an observed option. The number of log-on attempts the adversary would need in this case is about the number of rounds times half the number of options per round. Each observation that is a decoy, however, costs such an adversary somewhat. If the $j^{th}$ seen option is a decoy, then the adversary has to guess both $c_j$ and $c_{j+1}$ to see if the $(j+1)^{st}$ option appears in $r_{j+1}$.

As described above, the cryptographic function performed by the client is the hashing of the parsed values of the choices. It will be appreciated that other cryptographic functions may be used, such as an encryption function where the encryption key may be the hash of previous co catenation.

Similarly, the display need not be limited to words from a dictionary but could be images selected from a database, foreign language words, proper names or nonsense words instead of dictionary words or alphanumerical character strings. For visually impaired users, a sequence of audible tones may be provided with the user selecting the correct tone as a number on a key pad.

As described above, the password will usually be a sequence of several discrete pieces of information, words, images or the like, but it will be appreciated that the protocol may be used with a single piece of information presented as part of a larger set if a single round is all that is required.

The invention claimed is:

1. A method to control access to a data communication system with a password, said password having a plurality of components, said method comprising:

providing a first plurality of possible choices to a user using an output device, said first plurality of possible choices for selection by said user of a first component of said password;

receiving a first selection from said first plurality of choices using an input device, said first selection indicative of said first component of said password;

performing a cryptographic operation upon said first selection to generate a first output using a cryptographic engine;

utilizing said first output to provide a second plurality of choices to said user using the cryptographic engine, said second plurality of possible choices for selection by said user of a second component of said password;

receiving a second selection from said second plurality of choices using the input device, said second selection indicative of said second component of said password; and computing a user key from said first and second selections using the cryptographic engine.

2. The method according to claim 1 wherein said password includes more than two components requiring more than two selections and said method comprises providing one or more further plurality of choices generated from a previous output, said one or more further plurality of choices for selection by said user of one or more further components of said password, receiving further selections from said user from a corresponding one of said further plurality of choices, said further selections indicative of said one or more further components of said password, and generating further outputs by performing said cryptographic operation, said user key being computed from said first and second selections and all further selections.

3. The method according to claim 1 wherein said user key is used to access a secret key.

4. The method according to claim 1 wherein said cryptographic operation comprises combining a current selection with all previous selections to generate a first intermediate value, operating on said first intermediate value to generate a second intermediate value, sending said second intermediate value to another entity in said data communication system, receiving a third intermediate value generated by said another entity using said second intermediate value and information private to said another entity; and using said third intermediate value to generate a selection value used to determine said second plurality of choices.

5. The method according to claim 4 comprising converting said first intermediate value into an element of a finite field used in said data communication system and using said element to derive said second intermediate value.

6. The method according to claim 4 wherein said cryptographic operation utilizes elliptic curve cryptography and said second intermediate value is a first point on an elliptic curve computed by combining a random number with a second point on an elliptic curve derived from said first intermediate value.

7. The method according to claim 6 wherein said second point is derived from converting said first intermediate value into a coordinate of said second point and deriving said second point from said coordinate.

8. The method according to claim 6 comprising checking that said second point is on said elliptic curve to validate said second point.

9. The method according to claim 4 comprising applying the inverse of said random value to said third intermediate value to derive a third point and rendering said third point to generate said selection value.

10. A non-transitory computer readable medium comprising computer executable instructions for causing a cryptographic engine to perform the method according to claim 1.

11. A system for controlling access to a data communication system with a password, said password having a plurality of components, said system comprising:
a client device configured to receive input and provide output to a user and capable of communicating with at least one other entity in said data communication system, said client device comprising a cryptographic engine being configured for:
providing a first plurality of possible choices to said user, said first plurality of possible choices for selection by said user of a first component of said password;
receiving a first selection from said first plurality of choices, said first selection indicative of said first component of said password;
performing a cryptographic operation upon said first selection to generate a first output;
utilizing said first output to provide a second plurality of choices to said user, said second plurality of possible choices for selection by said user of a second component of said password;
receiving a second selection from said second plurality of choices, said second selection indicative of said second component of said password; and
computing a user key from said first and second selections.

12. The system according to claim 11 wherein said password includes more than two components requiring more than two selections and said cryptographic engine is further configured for providing one or more further plurality of choices generated from a previous output, said one or more further plurality of choices for selection by said user of one or more further components of said password, receiving further selections from said user from a corresponding one of said further plurality of choices, said further selections indicative of said one or more further components of said password, and generating further outputs by performing said cryptographic operation, said user key being computed from said first and second selections and all further selections.

13. The system according to claim 11 wherein said user key is used to access a secret key stored by said client device.

14. The system according to claim 13 wherein said client device comprises a secure module for storing said secret key.

15. The system according to claim 11 wherein said cryptographic operation comprises combining a current selection with all previous selections to generate a first intermediate value, operating on said first intermediate value to generate a second intermediate value, sending said second intermediate value to one of said at least one other entity, receiving a third intermediate value generated by said other entity using said second intermediate value and information private to said other entity; and using said third intermediate value to generate a selection value used to determine said second plurality of choices.

16. The system according to claim 15 wherein said cryptographic engine is further configured for converting said first intermediate value into an element of a finite field used in said data communication system and using said element to derive said second intermediate value.

17. The system according to claim 15 wherein said cryptographic engine is configured for performing elliptic cryptography and further configured such that said cryptographic operation utilizes elliptic curve cryptography and said second intermediate value is a first point on an elliptic curve computed by combining a random number with a second point on an elliptic curve derived from said first intermediate value.

18. The system according to claim 17 wherein said second point is derived from converting said first intermediate value into a coordinate of said second point and deriving said second point from said coordinate.

19. The system according to claim 17 wherein said cryptographic engine is further configured for checking that said second point is on said elliptic curve to validate said second point.

20. The system according to claim 15 wherein said cryptographic engine is further configured for applying the inverse of said random value to said third intermediate value to derive a third point and rendering said third point to generate said selection value.

* * * * *